United States Patent Office 3,330,391
Patented July 11, 1967

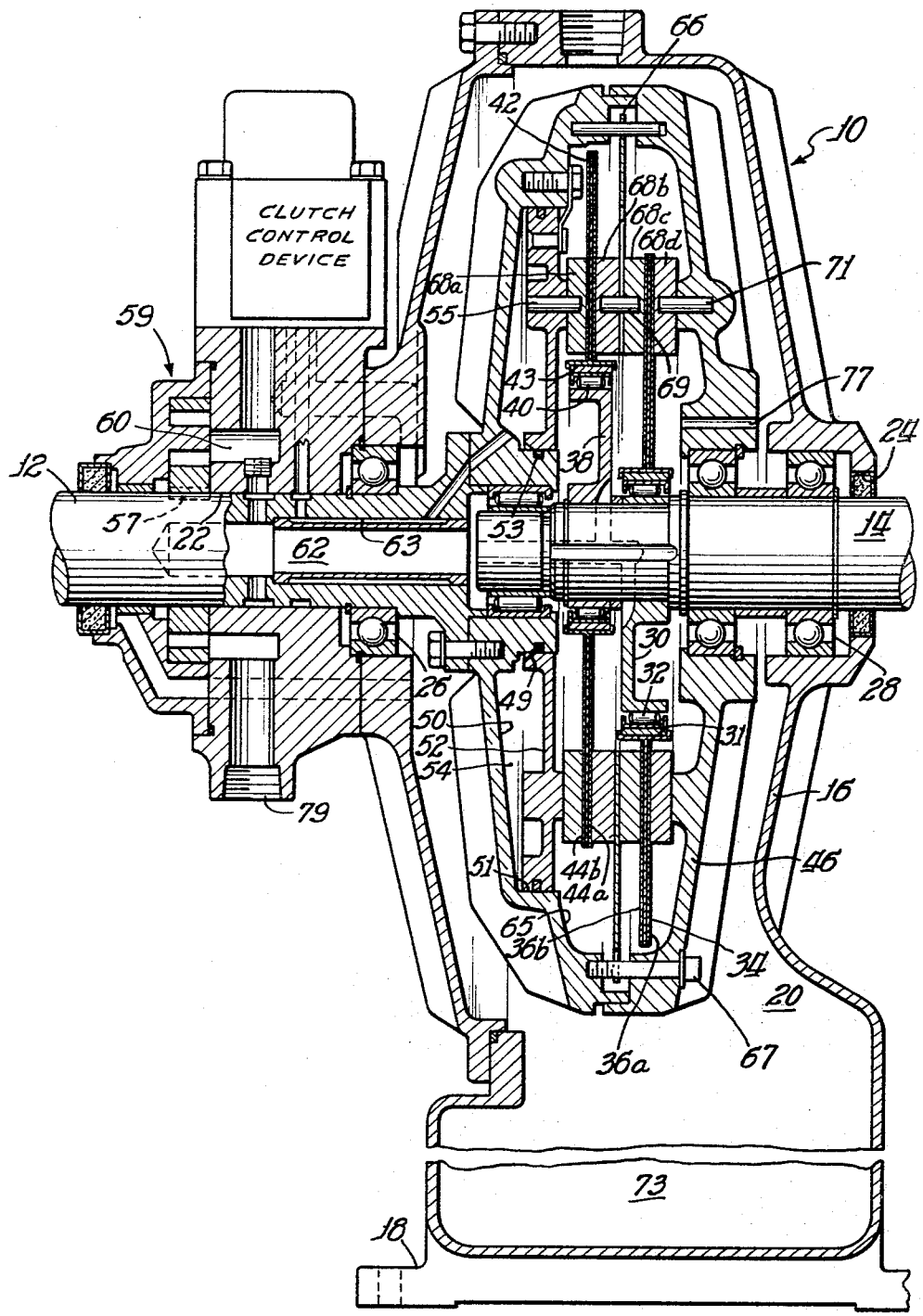

3,330,391
FRICTION ENGAGING MECHANISM
Anthony C. Mamo, Des Plaines, Ill., assignor to Borg-Warner Corporation, Chicago, Ill., a corporation of Illinois
Filed Mar. 31, 1965, Ser. No. 444,238
6 Claims. (Cl. 192—85)

This invention relates to a friction engaging mechanism such as a brake or clutch.

Brakes and clutches of the disc type having relatively rotatable and engageable friction discs and plates are well known in the art. In such a mechanism, the plates are normally splined or fixed in some manner to an input shaft and the friction discs are splined or fixed in some manner to an output shaft or vice versa. The plates and discs are normally pressed into engagement by suitable pressure creating means such as a fluid servomotor or spring mechanism.

It is well known that in the process of engaging such a mechanism, a considerable amount of energy in the form of heat, is generated between the engageable parts thereof. For severe applications, and/or prolonged slipping applications the heat so generated can cause glazing of the friction surface with a reduction in the coefficient of friction between the discs and plates.

It is also well known that in an operating mechanism of this type, there commonly exists a comparatively high relative velocity between each disc and plate prior to engagement. The relative velocity of any point on a disc or plate is equal to the product of the relative angular velocity times the radius of the point from the center of rotation. The relative rubbing velocity between a plate and disc upon engagement of the mechanism is thus greater at the outer periphery thereof than at the inner periphery. This difference in rubbing velocity generally results in generating a larger quantity of heat in the outer portion of the plate and disc than in the inner portion, or vice versa depending on the specific coefficient of friction slope. This, in turn, results in overloading one area of the clutch and underloading another, and produces undesirable heat distortion or bell-mouthing, or the friction disc and/or friction plate. This variation in rubbing velocity also limits the practicable diameter of such a mechanism as well as limits the usable width of friction area between the inner and outer peripheries. In other words, as the width of the friction material is increased, the respective peripheral speed results in an increased differential in coefficient of friction and thermal gradient thus aggravating the thermal distortion problem.

It is an object of the present invention to provide an improved friction engaging mechanism particularly adapted for high speed engagement and having provision for dissipating engagement energy across the friction disc equally to minimize heat distortion thereof.

It is an additional object of the present invention to provide engageable surfaces of the relatively rotatable members wherein the respective surfaces are exposed to the cooling media such that the heat transfer from these surfaces is substantially improved over heretofore known devices.

It is a still further object of the present invention to provide a large friction engaging surface which includes a friction facing material in combination with an engaging member having a substantially smaller engaging surface.

The invention consists of the novel constructions, arrangements, and devices to be hereinafter described and claimed for carrying out the above stated objects and such other objects as will appear from the following description of a preferred form of the invention illustrated with reference to the accompanying drawings, wherein:

The single figure is a view, partially in cross-section, of the preferred embodiment of the present invention.

Referring now to the figure, there is illustrated a friction engaging mechanism designated generally by the reference 10. The friction engaging mechanism 10 comprises an input shaft 12, an output shaft 14, and an annular fixed housing 16 which includes a base portion 18. The housing 16 forms an internal chamber 20 and is provided with an input shaft receiving apertures 22 and an output shaft receiving aperture 24. The input shaft 12 is provided with a bearing 26 to support the input shaft 12 for rotation with respect to the housing 16. The output shaft 14 is provided with a bearing 28 to support the output shaft 14 for rotation with respect to the housing 16.

The output shaft 14 is provided with a first hub 30 which carries a first bearing 32. A first disc 34 is mounted on the first bearing 32. It is noted the first hub 30 is non-concentric with respect to the output shaft 14. The first disc 34 is of a circular configuration with a circular aperture 31 disposed concentric with respect thereto. The first disc 34 includes friction facing material 36a and 36b mounted on the exterior surface thereof which material extends from a point near the aperture 31 to a point near the periphery of said disc 34.

The output shaft 14 carries a second hub 38 which carries a second bearing 40. A second circular-shaped disc 42 with a central concentric aperture 43 is rotatably mounted on the second bearing member 40. The second disc 42 includes friction facing material 44a and 44b mounted thereon in a manner similar to the friction facing material 36a and 36b which is mounted on the first disc 34. The input shaft 12 drives a casing member 46 which casing member 46 defines a disc chamber 65 for receipt of the first friction disc 34, second friction disc 42 and portions of the input shaft 12 and output shaft 14. The internal surface of the annular fixed housing 16 is spaced apart from the external surface of the casing member 46 to form the internal chamber 20 mentioned hereinabove.

The casing member 46 is provided with an annular recess 50 having an inner wall 49 and an outer wall 51. An annular piston 52 is reciprocally mounted in the annular recess 50 with an internal O ring positioned between the inner wall 49 and the piston 52 and an outer O ring positioned between the outer wall 51 and the piston 52. This arrangement provides a cylinder-piston arrangement wherein fluid may be admitted to piston chamber 54 to shift the piston 52 with respect to its supporting structure, i.e., the housing 46. Pins 55 may be provided to orient the relative positions of the piston 52 with respect to the housing 46. In the disclosed embodiment, the piston 52 is shiftable with respect to the pins 55.

The input shaft 12 includes splines 57 which rotatably support an internal-external gear pump 59. Thus, rotation of the input shaft 12 causes a corresponding rotation of the gear pump gears. The gear pump outlet 60 is in communication with central bore 62 and, by way of exterior control apparatus (not shown), is also in communication with outer bore 63. The central bore 62 provides means to transfer lubricating and cooling media from the gear pump outlet 60 to the cooling chamber 65. The input shaft 12 also includes an outer bore 63 which provides means to transfer fluid from the pump outlet 60 to the piston chamber 54 through a control valve (not shown).

A plurality of engaging pads 68a, 68b, 68c and 68d are disposed on opposite sides of friction discs 34 and 42 to provide for engagement with said discs. The engaging pads 68 are mounted within casing member 46 such that pads 68a, 68b and 68c may shift axially with respect to housing member 16. All of the pads are restricted against rotative movement relative to the casing member 46. Pins 55 restrain rotative movement of pad 68a relative to piston 52 as well as relative to casing member 46. Web 66 is fixed relative to casing member 46 such as by cap screw 67. The web 66 is fixed to pads 68b and 68c by way of stub pin 69 and screw 67. Pad 68d is restricted against rotative movement relative to the casing memory 46 by anchor pin 71.

The low portion of the annular fixed housing 16 includes a sump 73 which may be used to provide a fluid source for the gear pump 59.

In operation, rotation of the input shaft 12 results in corresponding rotation of the casing member 46. This also results in rotation of the gear pump 59. The pads 68a, 68b, 68c and 68d which are carried by casing member 46 rotate at the same speed as casing member 46. With the clutch in a disengaged position, the piston 52 is shifted to the left as viewed in the figure and thus, there is clearance between pads 68a–68b and their associated second disc 42. There is also clearance between pads 68c–68d and their associated first disc 34. There is, therefore, no driving connection between the input shaft 12 and the discs 34, 42 and thus, with the unit in a disengaged position, the output shaft 14 may remain stationary. Under this condition, the discs are free to rotate with respect to the output shaft and thus the drag torque normally associated with submerged or wet clutches is substantially reduced. This is due, at least in part, to the ability of the disc to rotate with the circulating fluid. The drag torque is therefore a function of the friction within the disc bearings.

During the period of time the input shaft is rotating, the gear pump 59 circulates fluid from the outlet 60 through central bore 62 into the cooling chambers 65 and 20. Fluid in the cooling chamber 65 is in intimate contact with the elements disposed within the casing member 46 to provide a heat exchange media therefore. Fluid passes from the cooling chamber 65 to the sump 73 by way of aperture 77 in the casing member 46. The pump inlet 79 is in communication with the sump 73 by way of a return line (not shown).

The clutch may be engaged to create a slipping condition or a fully locked-up condition as desired. This is accomplished by modulating the pump outlet pressure by way of a conventional fluid control system (not shown) and directing the fluid to outer bore 63 and thence to piston chamber 54. This fluid, under pressure, acts to shift the piston member 52 to the right, as viewed in the figure, until pads 68a–68b and 68c–68d engage the first disc 34 and the second disc 42 respectively.

An important feature of the present invention is the provision of two engaging members (discs 34, 42 and pads 68a, 68b, 68c, 68d) both of which include engaging surfaces. The engagement surfaces associated with the first engaging member (discs 34, 42) is substantially greater—preferably two or more times greater—than the engaging surfaces associated with the second engaging member (pads 68a, 68b, 68c, 68d). The friction engaging or softer material is disposed on the engaging member characterized as having the larger engaging surface. This configuration, compared with a configuration wherein the friction facing material is disposed on the smaller engaging surface, exhibits a much improved operational life. This improvement is particularly important if the apparatus is exposed to continuous or extended slipping conditions as the material which fails first (soft side) in the structure is subjected to rest periods equal to the work periods during slip.

The above-preferred embodiment has been described as a clutch. It will be readily apparent to those skilled in the art the apparatus finds equal utility as a brake or as a fluid coupling of infinitely variable capacity.

This structure provides engageable members wherein, under slipping conditions, the absolute rubbing velocity between adjacent faces can be reduced between 40% and 95% relative to the equivalent concentric type clutch. Except for minor bearing friction losses there is no significant rotational difference between the engaging faces.

It is to be understood that the present invention is not to be limited to the specific constructions and arrangements shown and described, except only insofar as the claims may be so limited, as it will be understood by those skilled in the art that changes may be made without departing from the principles of the invention.

What is claimed is:

1. A friction engaging device comprising a fixed housing member defining an internal chamber, a first shaft receiving aperture, a second shaft receiving aperture, a gear pump receiving recess adjacent said first shaft receiving aperture, first passage means and second passage means; an input shaft extending through said first shaft receiving aperture terminating within said internal chamber; a casing member fixed to said input shaft defining an annular recess, a third shaft receiving aperture, and a cooling chamber; an output shaft extending through said second shaft receiving aperture and said third shaft receiving aperture terminating within said cooling chamber; a plurality of radially disposed discs providing disc engaging surfaces thereon; means for mounting said plurality of radially disposed discs on said output shaft such that said plurality of radially disposed discs may shift axially with respect to said output shaft and such that said plurality of radially disposed discs may rotate relative to said output shaft and such that said plurality of radially disposed discs are nonconcentric with respect to said output shaft; a plurality of engaging pads carried by said casing member providing pad engaging surfaces adapted to engage said disc engaging surfaces; a piston member mounted within said annular recess defining a piston chamber between said piston and said casing member; said piston adapted to actuate said plurality of pads to cause engagement of said pads with said plurality of radially disposed discs; a pump positioned in said gear pump receiving recess driven by said input shaft; and means providing communication from said gear pump to said first passage means and said second passage means to effect fluid circulation through said cooling chamber and to effect operation of said piston member.

2. A friction engaging device comprising a fixed housing member defining an internal chamber, a first shaft receiving aperture, a second shaft receiving aperture, a pump receiving recess adacent said first shaft receiving aperture, first passage means, and second passage means; an input shaft extending through said first shaft receiving aperture terminating within said internal chamber; a first shaft passage within said input shaft in communication with said first passage means; a second shaft passage within said input shaft in communication with said second passage means; a casing member fixed to said input shaft defining an anular recess, a third shaft receiving aperture, and a cooling chamber; an output shaft extending through said second shaft receiving aperture and said third shaft receiving aperture terminating within said cooling chamber; a plurality of radially disposed discs providing disc engaging surfaces thereon; means for mounting said plurality of radially disposed discs on said output shaft such that said plurality of radially disposed discs may shift axially with respect to said output shaft and such that said plurality of radially disposed discs may rotate relative to said output shaft and such that said plurality of radially disposed discs are non-concentric with respect to said output shaft; a plurality of engaging pads carried by said casing member providing pad engaging surfaces adapted to engage said disc engaging surfaces; a piston member mounted within said annular recess defining a piston chamber between said piston and said casing member; said piston adapted to actuate said plurality of pads to cause engagement of said pads with said plurality of radially disposed discs; a pump having an outlet in communication with said first passage means and in communication with said second passage means positioned in said gear pump receiving recess driven by said input shaft; means providing communication from said first shaft passage to said piston chamber; and means providing communication from said second shaft passage to said cooling chamber.

3. A friction engaging device comprising a fixed housing member defining an internal chamber, a first shaft receiving aperture, a second shaft receiving aperture, and a gear pump receiving recess adjacent said first shaft receiving aperture; an input shaft extending through said first shaft receiving aperture terminating within said internal chamber; a casing member fixed to said input shaft defining an annular recess, a third shaft receiving aperture, and a cooling chamber; an output shaft extending through said second shaft receiving aperture and said third shaft receiving aperture terminating within said cooling chamber; a plurality of radially disposed discs providing disc engaging surfaces thereon; means for mounting said plurality of radially disposed discs on said output shaft such that said plurality of radially disposed discs may shift axially with respect to said output shaft and such that said plurality of radially disposed discs may rotate relative to said output shaft and such that said plurality of radially disposed discs are non-concentric with respect to said output shaft; a plurality of engaging pads carried by said casing member providing pad engaging surfaces adapted to engage said disc engaging surfaces; said disc engaging surfaces being larger than said pad engaging surfaces; and friction facing material disposed on said disc engaging surfaces; a piston member mounted within said annular recess defining a piston chamber between said piston and said casing member; said piston adapted to actuate said plurality of pads to cause engagement of said pads with said plurality of radially disposed discs; a gear pump positioned in said gear pump receiving recess driven by said input shaft; and means providing communication from said gear pump to effect fluid circulation through said cooling chamber and to effect actuation of said piston member.

4. A friction engaging device comprising a fixed housing member defining an internal chamber, a first shaft receiving aperture, a second shift receiving aperture, and a gear pump receiving recess adjacent said first shaft receiving aperture; an input shaft extending through said first shaft receiving aperture terminating within said internal chamber; a casing member fixed to said input shaft defining an annular recess, a third shaft receiving aperture, and a cooling chamber; an output shaft extending through said second shaft receiving aperture and said third shaft receiving aperture terminating within said cooling chamber; a plurality of radially disposed discs providing disc engaging surfaces thereon; means for mounting said plurality of radially disposed discs on said output shaft such that said plurality of radially disposed discs may shift axially with respect to said output shaft and such that said plurality of radially disposed discs may rotate relative to said output shaft and such that said plurality of radially disposed discs are non-concentric with respect to said output shaft; a plurality of engaging pads carried by said casing member providing pad engaging surfaces adapted to engage said disc engaging surfaces; said disc engaging surfaces being larger than said pad engaging surfaces; friction facing material disposed on said disc engaging surfaces; a piston member mounted within said annular recess defining a piston chamber between said piston and said casing member; said piston adapted to actuate said plurality of pads to cause engagement of said pads with said plurality of radially disposed discs; a gear pump positioned in said gear pump receiving recess driven by said input shaft; and means providing communication from said gear pump to effect fluid contact with said friction facing material to dissipate heat therefrom; and control means to modulate pressure from said gear pump and provide for actuation of said piston member.

5. A friction engaging device comprising a fixed housing member defining an internal chamber, a first shaft receiving aperture, a second shaft receiving aperture, and a gear pump receiving recess adjacent said first shaft receiving aperture; an input shaft extending through said first shaft receiving aperture terminating within said internal chamber; a casing member fixed to said input shaft defining an annular recess, a third shaft receiving aperture, and a cooling chamber; an output shaft extending through said second shaft receiving aperture and said third shaft receiving aperture terminating within said cooling chamber; a plurality of radially disposed discs providing disc engaging surfaces thereon; means for mounting said plurality of radially disposed discs on said output shaft such that said plurality of radially disposed discs may shift axially with respect to said output shaft and such that said plurality of radially disposed discs may rotate relative to said output shaft and such that said plurality of radially disposed discs are non-concentric with respect to said output shaft; a plurality of engaging pads carried by said casing member providing pad engaging surfaces adapted to engage said disc engaging surfaces; a piston member mounted within said annular recess defining a piston chamber between said piston and said casing member; said piston adapted to actuate said plurality of pads to cause engagement of said pads with said plurality of radially disposed discs; a gear pump positioned in said gear pump receiving recess driven by said input shaft; means providing communication from said gear pump to effect fluid circulation through said cooling chamber and to effect operation of said piston member; said internal chamber providing means to accumulate fluid; and means providing communication from said internal chamber to said gear pump.

6. An apparatus comprising an input shaft, an ouput shaft, a casing member connected to said input shaft defining a cooling chamber therein, a plurality of radially disposed discs having disc engaging surfaces thereon mounted non-concentric with respect to and relatively rotatable with respect to said output shaft, a plurality of pads having pad engaging surfaces thereon mounted on said casing member in operative engagement with said plurality of radially disposed discs, means to shift said pads into engagement with said discs, said disc engaging surfaces being larger than said pad engaging surfaces, and friction facing material disposed on said disc engaging surfaces.

References Cited
UNITED STATES PATENTS

| | | | |
|---|---|---|---|
| 2,348,025 | 5/1944 | Peets et al. | 192—113.1 |
| 3,213,984 | 10/1965 | Cook | 192—85 |
| 3,237,737 | 5/1965 | Mamo | 192—113.2 X |

FOREIGN PATENTS 339,581  12/1930  Great Britain.

BENJAMIN W. WYCHE, III, *Primary Examiner.*